United States Patent [19]

Kato et al.

[11] Patent Number: 4,683,275

[45] Date of Patent: Jul. 28, 1987

[54] METHYLSTYRENE MALEIMIDE COPOLYMER

[75] Inventors: Masayuki Kato; Yoshio Taguchi, both of Saitama; Chihiro Imai, Kanagawa, all of Japan; Tokuo Makishima, deceased, late of Saitama, Japan, by Nobuko Makishima, legal representative

[73] Assignee: Toa Nenryo Kogyo Kabushiki Kaisha, Tokyo, Japan

[21] Appl. No.: 778,597

[22] Filed: Sep. 20, 1985

[30] Foreign Application Priority Data

Sep. 21, 1984 [JP]   Japan ................................ 59-196737

[51] Int. Cl.$^4$ .......................................... C08F 22/40
[52] U.S. Cl. .............................. 526/262; 525/327.6; 525/378; 525/379
[58] Field of Search ................... 526/262; 525/327.6, 525/378, 379

[56] References Cited

U.S. PATENT DOCUMENTS

| | | | |
|---|---|---|---|
| 2,342,295 | 2/1944 | Orthner et al. | 526/262 |
| 3,352,832 | 11/1967 | Barr et al. | 526/262 |
| 3,666,720 | 5/1972 | Nield et al. | 526/262 |
| 3,676,404 | 7/1972 | Nield | 526/262 |
| 3,721,724 | 3/1973 | Uebele et al. | 526/262 |
| 3,766,142 | 10/1973 | Nield et al. | 526/262 |
| 4,160,792 | 7/1979 | Fava | 526/262 |

FOREIGN PATENT DOCUMENTS 1720794  7/1971  Fed. Rep. of Germany .

OTHER PUBLICATIONS

Derwent Abstract 85-069150/12 (English language abstract of Offenlegungsschrift 1720794).

Boor, Jr., John; *Ziegler-Natta Catalysts and Polymerzations;* p. 473, Academic Press, New York, 1979.

*Primary Examiner*—Harold D. Anderson
*Attorney, Agent, or Firm*—M. B. Kurtzman

[57] ABSTRACT

A copolymer of p-methylstyrene and N-substituted maleimide exhibits high temperature stability.

13 Claims, No Drawings

METHYLSTYRENE MALEIMIDE COPOLYMER

DETAILED DESCRIPTION OF THE INVENTION

Background of the Invention

The present invention relates to a new methylstyrene copolymer, and more particularly it relates to a copolymer composed of p-methylstyrene and (N-substituted) maleimide.

It is known that a copolymer of styrene or alpha-methylstyrene with maleic anhydride is a heat-resistant styrene resin. This copolymer, however, has a disadvantage that it discolors, foams, loses weight, and crosslinks when heated at a high temperature, particularly above 230° C. There is known a copolymer composed of an aromatic monomer, which is substantially styrene and/or alpha-methylstyrene, and (N-substituted) maleimide (Japanese Laid-open Nos. 125241/1982 and 125242/82). This copolymer is superior in high-temperature stability, but is equivalent to the styrene-maleic acid copolymer. Thus there has been a demand for a material having improved heat stability.

SUMMARY OF THE INVENTION

It is an object of this invention to provide a styrene resin which is superior in heat resistance and high-temperature stability.

The present inventors carried out a series of researches which led to the findings that the object of this invention can be achieved by a copolymer composed of p-methylstyrene and (N-substituted) maleimide. The present invention is based on these findings.

Accordingly, the gist of this invention resides in a methylstyrene copolymer composed of:

(A) 60 to 99 mol % of the structural unit represented by the following formula:

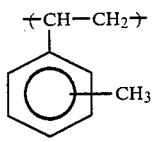

(where one having the methyl group at para position accounts for 80 mol % or more, one having the methyl group at meta position accounts for 20 mol % or less, and one having the methyl group at ortho position accounts for 1 mol % or less) and (B) 40 to 1 mol % of the structural unit represented by the following formula:

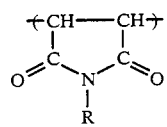

(where R is a hydrogen atom, a $C_1$–$C_6$ alkyl group, or a $C_6$–$C_{10}$ aryl group).

DESCRIPTION OF THE PREFERRED EMBODIMENTS

The copolymer of this invention can be produced by either of the following two methods:

(1) Maleimide or N-substituted maleimide represented by the following formula:

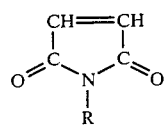

(where R is defined as above) or a solvent solution thereof is added to p-methylstyrene or a methylstyrene mixture composed of 80 mol % or more of p-methylstyrene, 20 mol % or less of m-methylstyrene, and 1 mol % or less of o-methylstyrene, or a solvent solution thereof, at a constant rate over a period equivalent to 50 to 90% of the total polymerization time. Polymerization is performed with heating. Polymerization is continued with heating for a period equivalent to 50 to 10% of the total polymerization time.

(2) Maleic anhydride or a solvent solution thereof is added to p-methylstyrene or the above-mentioned methylstyrene or a solvent solution thereof in the same way as in method (1), and polymerization is performed in the same way as in method (1) to give a copolymer of p-methylstyrene or methylstyrene mixture with maleic anhydride. Subsequently, this copolymer is reacted with ammonia or a primary amine of the formula $RNH_2$ (where R is a $C_1$–$C_6$ alkyl group or a $C_6$–$C_{10}$ aryl group) to make the imide.

The above-mentioned methylstyrene mixture used in this invention is a mixture of methylstyrene isomers rich in p-methylstyrene. This mixture contains 80 wt % or more, preferably 95 wt % or more, more preferably 97 wt % or more of p-methylstyrene, and 1 wt % or less, preferably 0.1 wt % or less, more preferably 0.05 wt % or less of o-methylstyrene, with the remainder being m-methylstyrene. A typical mixture is composed of 95 to 99 wt % of p-methylstyrene, 1 to 5 wt % of m-methylstyrene, and 0 to 0.5 wt % of o-methylstyrene. The mixture of methylstyrene isomers mentioned as above is disclosed in Japanese Patent Laid-open No. 147031/1978. It can be obtained by dehydrogenation of p-ethyltoluene which is produced according to the process described in Japanese Patent Laid-open No. 12816/1978.

Examples of the N-substituted maleinimide represented by the above-mentioned formula include N-methylmalemide, N-ethylmaleimide, N-isopropylmaleimide, N-n-butylmaleimide, N-n-hexylmaleimide, N-phenylmaleimide, N-tolylmaleimide, and N-xylylmaleimide.

For best results in terms of heat resistance and high temperature stability, it is preferred that the copolymerization be performed by adding p-methylstyrene or methylstyrene mixture (monomer II) or a solvent solution thereof or maleic anhydride or a solvent solution thereof to maleimide or N-substituted maleimide (monomer I) or a solvent solution thereof at a constant rate over a period equivalent to 50 to 90% of the total polymerization time and continuing polymerization with heating for a period equivalent to 50 to 10% of the total polymerization time, the resulting copolymer is free of the above-mentioned disadvantages and is good in heat resistance and high-temperature stability.

The copolymer of this invention and the copolymer of p-methylstyrene or methylstyrene mixture with maleic anhydride can be produced by solution polymerization, bulk polymerization, or suspension polymerization. Preferable among these methods is the solution polymerization which employs a solvent solution of monomer I, monomer II, and maleic anhydride. It is advantageous in the removal of reaction heat and the ease of operation during or after copolymerization. Moreover, it provides a uniform copolymer.

Examples of the solvent that can be used for solution polymerization include saturated aliphatic hydrocarbons such as hexane, heptane, and octane; saturated alicyclic hydrocarbons such as cyclohexane and cycloheptane; aromatic hydrocarbons such as benzene, toluene, and xylene; and ketones such as acetone, methyl ethyl ketone, diethyl ketone, and methyl isobutyl ketone.

The copolymerization reaction is performed with heating in the presence or absence of a radical polymerization initiator. The radical polymerization initiator that can be used is a free radical generator; for example, peroxides such as benzoyl peroxide, ditertiarybutyl peroxide, dicumyl peroxide, diacetyl peroxide, acetylenebenzoyl peroxide, and cumene hydroperoxide, and azo compounds such as azobisisobutyronitrile. The initiator is used in an amount of $1 \times 10^{-2}$ to $1 \times 10^{-4}$ times (by weight) the total quantities of monomer I and monomer II in the case of method (1) and in an amount of $1 \times 10^{-2}$ to $1 \times 10^{-4}$ times (by weight the total quantities of monomer I and maleic anhydride in the case of method (2).

The ratio of monomer I to monomer II in method (1) or the ratio of monomer I to maleic anhydride in method (2) is 68-98 parts by weight (wt %) to 32-2 parts by weight (wt %), preferably 80-95 parts by weight (wt %) to 20-5 parts by weight (wt %). If monomer II or maleic anhydride is used in an amount the above-mentioned limits or less, the resulting copolymer is not sufficiently improved in heat resistance. In the opposite case, the copolymerization reaction is difficult in control and the resulting copolymer is extremely poor in moldability and high-temperature stability.

The copolymerization reaction temperature in methods (1) and (2) is 40° to 200° C., preferably 70° to 150° C., and the total polymerization time is 3 to 30 hours, preferably 5 to 20 hours. A period of time corresponding to 50 to 90%, preferably 70 to 80% of the total polymerization time is allocated to adding monomer II or maleic anhydride to monomer I at a constant rate, during which reaction is performed with heating. The remaining period of time which is 50 to 10%, preferably 30 to 20% of the total polymerization time is allocated to performing continued reaction with heating.

The addition of monomer II or maleic anhydride or a solvent solution thereof to monomer I or a solvent solution thereof is accomplished by adding monomer II or maleic anhydride or a solvent solution thereof continuously at a constant rate or in equal small portions at regular intervals.

Where the above-mentioned method (1) is employed, the copolymer of this invention can be obtained directly. Where the method (2) is employed, a copolymer of p-methylstyrene or methylstyrene mixture with maleic anhydride is produced first and this copolymer (referred to as PMSM hereinafter) is subsequently converted into an imide.

The reaction to convert p-methylstryene-maleic anhydride copolymer (PMSM) into an imide is accomplished by reacting PMSM with ammonia or a primary amine of the abovementioned formula, preferably in the presence of a proper solvent selected from those which are used in the production of the copolymer. The reaction is effectively performed by the combined use of a tertiary alkylamine having a catalytic action such as triethylamine, trimethylamine, tripropylamine, and tributylamine.

Examples of the primary amine include methylamine, ethylamine, n-propylamine, n-butylamine, isobutylamine, n-hexylamine, aniline, tolylamine, and xylylamine.

Ammonia or the primary amine is used in an amount of 1 mol equivalent or more, preferably 1 to 2 mol equivalent for the maleic anhydride group in PMSM. The reaction for imide formation is performed at 40° to 250° C. for 0.5 to 20 hours, preferably at 70° to 170° C. for 2 to 10 hours.

The copolymer of this invention is obtained by the abovementioned method (1) or (2). The copolymer thus obtained is composed of 60 to 99 mol %, preferably 65 to 97 mol %, most preferably 80 to 95 mol % of the structural unit (A) and 40 to 1 mol %, preferably 35 to 3 mol %, most preferably 20 to 5 mol % of the structural unit (B). The arrangement of the structural units (A) and (B) forms the triad distribution of AAA 20-88% (preferably 50 to 88%), BAA 4-32% (preferably 4 to 20%), AAB 4-32%, and BAB 4-16% (preferably 4 to 12%). The weight-average molecular weight ($\overline{Mw}$) is about 1,000 to about 1,000,000, preferably about 10,000 to about 300,000, most preferably between 10,000 and 100,000, and the molecular weight distribution (Mw/Mn) is about 1.5 to 4.0, preferably between 2 and 3.

The copolymer of this invention is superior in heat resistance and high-temperature stability to the styrene-maleic anhydride copolymer and the p-methylstyrene-maleic anhydride copolymer (PMSM) disclosed in Japanese Patent Application No. 48720/1983. It is also superior in heat resistance to the copolymer in which the monomer I is replaced by styrene or vinyltoluene. The preferred copolymers have a balance of heat related properties: Vicat softening point in excess of 125° C., thermal decomposition in excess of 285° C., no foaming in Geer oven test, and weight loss of less than 1.0% at decomposition temperatures less than 300° C. and less than 2.0% at decomposition temperatures of 300° C. and higher.

The copolymer of this invention which is superior in heat resistance and thermal stability will find use as automotive parts (e.g., meter cover, instrument panel, and radiator grill), parts of household electrical appliances, parts of office automation equipment, and electronic parts.

EXAMPLES

The invention is now described in more detail with reference to the following examples, in which quantities are expressed as parts by weight or wt % unless otherwise indicated, except the triad distribution which is expressed in percent.

The characterization of the copolymer and the measurement of physical properties were carried out according to the following methods:

Content of the fraction of maleic anhydride polymer:
Measured with an infrared spectrophotometer (Model A-3, made by Nippon Bunko Co.) for a solution prepared by dissolving 0.08 g of the copolymer in 5 ml of chloroform.

Molecular weight and molecular weight distribution: Measured at 135° C. with GPC (Model 150C, made by Waters Co.) (column: GMH 6, made by Toyo Soda Kogyo, solvent: o-dichlorobenzene) and expressed in terms of polystyrene.

Structure of the copolymer: Determined by $^{13}$C NMR using Fourier transform type NMR spectrometer, Model XL-200, made by Varian Co., on the sample prepared by dissolving 200 mg of the copolymer in 1 ml of CDCl$_3$. (Conditions 60° C., 90° pulse, pulse interval 5.0 seconds, integration 5000 times.)

Vicat softening point: ASTM D1525

Thermal decomposition temperature: The temperature at which the weight of the copolymer measured by a thermobalance begins to decrease when the copolymer is heated at a rate of 5° C./min in an air stream (60 ml/min).

Geer oven test: The weight loss of a press-formed test piece measuring 12.7 cm × 1.27 cm × 3 mm, which takes place after heating at 250° C. for 1 hour in a Geer oven.

EXAMPLE 1

Into a polymerization vessel equipped with a stirrer was charged 90 parts of methylstyrene mixture composed of 97% of p-methylstyrene and 3% of m-methylstyrene. The atmosphere in the vessel was replaced with nitrogen and the reactant was heated to 80° C. A solution prepared by dissolving 15.0 parts of N-phenylmaleinimide an 0.30 parts of benzoyl peroxide in 60 parts of methyl ethyl ketone was added continuously with stirring over a period of 6 hours during which copolymerization was performed. After the addition of N-phenylmaleinimide, the reaction was continued at 80° C. for 2 hours. When the reaction was complete, 150 parts of methyl ethyl ketone was added to the reaction liquid. The resulting solution was cooled to room temperature and then poured into ten times as much methanol as the solution by volume, so as to separate the copolymer by precipitation, followed by drying in vacuo. Thus there was obtained the copolymer of this invention in a 62% yield.

The result of GPC analysis indicated that the copolymer has a molecular weight ($\overline{\text{M}}$w) of 151,000 and a molecular weight distribution (Mw/Mn) of 2.53. The GPC chart (attached hereto) showing the normal distribution suggests that the copolymer has a uniform composition.

The following are measurements obtained to determine the structure of the copolymer.

(1) Bond between structural unit (A) and structural unit (B).

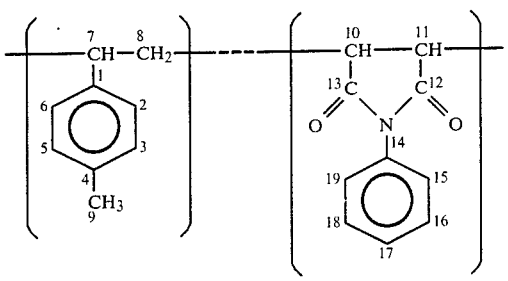

| Values of Chemical Shift in $^{13}$C—NMR Spectrum | | | |
|---|---|---|---|
| Carbon | Chemical Shift* | Carbon | Chemical Shift* |
| 1 | 135.0–144.3 | 10 | 52.3 |
| 2 | 127.7 | 11 | 52.3 |
| 4 | 134.7 | 12 | 177.4 |
| 6 | 127.7 | 13 | 177.4 |
| 7 | 44.3 | 14 | 132.2 |
| 8 | 40.3 | 17 | 127.7 |
| 9 | 21.0 | 3, 5, 15, 16, 18, 19 | 126.6, 128.8 |

*ppm: TMS standard (2) Content of N-phenylmaleimide polymer [structural unit (B)]:

The content was calculated according to a calibration curve which had previously been prepared based on the percent transmission at the absorption band 1720 cm$^{-1}$ assignable to the carbonyl stretching vibration and at the absorption band 1510 cm$^{-1}$ assignable to the benzene nucleus. The content was 16.9 mol % (23.0 wt %). Accordingly, the content of structural unit (A) was 83.1 mol %.

(3) Ratio of m-methyl group to p-methyl group in structural unit (A):

The fraction of m-methylstyrene polymer in structural unit (A) (83.1 mol %) was 2.5 mol %. This was calculated from the intensity ratio of carbon at 6' (125.6 ppm) and carbon at 4 (134.7 ppm) of the benzene ring in structural unit (A) shown in the following formula. Thus the composition of the copolymer was determined as follows:

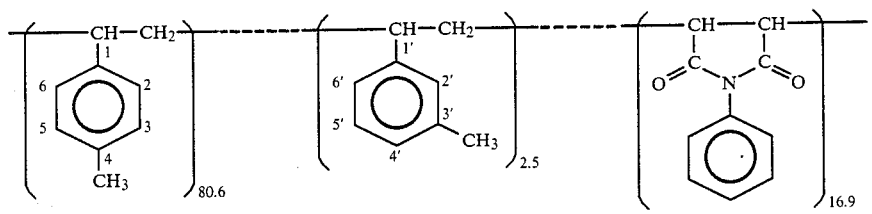

(4) Arrangement and distribution of structural units in the copolymer.

These were calculated as follows from the chemical shift and intensity ratio of the NMR spectrum in the C$_1$ region mentioned in the above paragraph (1).

| Arrangement of Structural Unit* | Chemical Shift (ppm) | Triad (%) |
|---|---|---|
| AAA | 142.7 | 61 |
| BAA | 141.2 | 15 |
| AAB | 136.3 | 15 |

-continued

| Arrangement of Structural Unit* | Chemical Shift (ppm) | Triad (%) |
|---|---|---|
| BAB | 135.7 | 9 |

Note:

A: 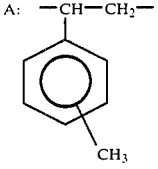  B: 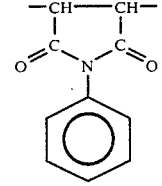

Incidentally, the assignment of the spectrum was made according to J. Polym. Sci. Polym. Lett. Ed., 14, 401 (1976).

The thermal properties of the copolymer were as follows
Vicat Softening Point: 147.8° C.
Thermal decomposition temperature: 305° C.
Geer oven test: No foaming, weight loss 1.3%

EXAMPLES 2 AND 3

Copolymerization was performed in the same way as in Example 1, except that the amounts of methylstyrene mixture and N-phenylmaleimide were changed, to give two kinds of copolymers.

The resulting copolymers were examined for structure and physical properties in the same manner as in Example 1. The results are shown in Tables 1 to 3.

EXAMPLE 4 p-Methylstyrene-maleic anhydride copolymer (PMSM) was prepared in the same manner as in Example 1 except that N-phenylmaleimide was replaced by 10 parts of maleic anhydride.

One hundred parts of this copolymer was dissolved in 200 parts of methyl ethyl ketone. To the resulting solution were added 1.1 times as much aniline as maleic anhydride by mole and 1 part of triethylamine. Reaction was performed at 130° C. for 7 hours. The reaction solution was poured into 8 times as much methanol as the reaction solution to cause the polymer to separate out. The polymer was filtered off and dried in vacuo. Thus the copolymer of this invention was obtained. The analysis by $^{13}$C-NMR indicated that the acid anhydride group in PMSM was converted into the imide group at a rate of 97%.

The composition and physical properties of the resulting copolymer are shown in Tables 1 to 3.

COMPARATIVE EXAMPLE 1

Copolymerization reaction was performed in the same manner as in Example 3 except that the methylstyrene mixture was replaced by styrene and N-phenylmaleinimide was replaced by maleic anhydride. The composition and physical properties of the resulting copolymer are shown in Table 1 to Table 3.

COMPARATIVE EXAMPLE 2

PMSM was prepared in the same way as in Example 4. The composition and physical properties of PMSM are shown in Table 1 and Table 3.

COMPARATIVE EXAMPLE 3

Copolymerization reaction was performed in the same manner as in Example 1 except that N-phenylmaleinimide was replaced by maleic anhydride. The composition and physical properties of the resulting copolymer are shown in Table 1 to Table 3.

COMPARATIVE EXAMPLE 4

Copolymerization reaction was performed in the same manner as in Example 2 except that the methylstyrene mixture was replaced by styrene. The composition and physical properties of the resulting copolymer are shown in Table 1 to Table 3.

COMPARATIVE EXAMPLE 5

Copolymerization reaction was performed in the same manner as in Example 2 except that the methylstyrene mixture was replaced by vinyl-toluene (m-methylstyrene 67% and p-methylstyrene 33%). The composition and physical properties of the resulting copolymer are shown in Table 1 to Table 3.

TABLE 1

| | Monomers used (parts)** | | | | | Yield | Content of NPM in copolymer | | Molecular weight and molecular weight distribution | | |
|---|---|---|---|---|---|---|---|---|---|---|---|
| | PMS | ST | VT | NPM | MA | (%) | (wt %) | (mol %) | $\overline{Mw} \times 10^{-4}$ | $\overline{Mn} \times 10^{-4}$ | $\overline{Mw}/\overline{Mn}$ |
| Example 1 | 90 | — | — | 15 | — | 62 | 23.0 | 16.9 | 15.1 | 6.0 | 2.5 |
| Example 2 | 90 | — | — | 10 | — | 84 | 11.9 | 8.7 | 21.1 | 7.9 | 2.7 |
| Example 3 | 90 | — | — | 5 | — | 76 | 6.9 | 5.1 | 20.4 | 8.5 | 2.4 |
| Example 4 | (90) | — | — | — | (10) | — | 21.5 | 15.8 | 17.8 | 6.7 | 2.6 |
| Comparative Example 1 | — | 90 | — | — | 5 | 74 | 7.1* | 8.4* | 22.2 | 9.4 | 2.4 |
| Comparative Example 2 | 90 | — | — | — | 10 | 72 | 13.9* | 16.3* | 17.4 | 6.9 | 2.5 |
| Comparative Example 3 | 90 | — | — | — | 15 | 80 | 17.9* | 21.0* | 15.7 | 7.1 | 2.2 |
| Comparative Example 4 | — | 90 | — | 10 | — | 76 | 13.2 | 8.4 | 17.4 | 7.0 | 2.5 |
| Comparative Example 5 | — | — | 90 | 10 | — | 74 | 13.5 | 9.9 | 16.9 | 6.7 | 2.5 |

**PMS: Methylstyrene mixture, ST: Styrene, VT: Vinyltoluene, NPM: Phenylmaleinimide, MA: Maleic anhydride
*Content of maleic anhydride unit

TABLE 2

| Arrangement of structural unit | Triad (%) | | |
|---|---|---|---|
| | Example 2 | Example 3 | Example 4 |
| AAA | 76 | 85 | 63 |
| BAA | 8.5 | 5 | 14 |
| AAB | 8.5 | 5 | 14 |
| BAB | 7 | 5 | 9 |

TABLE 3

| Example No. | Vicat softening point (°C.) | Thermal decomposition temperature (°C.) | Geer oven test Foaming | Weight loss (%) |
|---|---|---|---|---|
| Example 1 | 147.8 | 305 | none | 1.3 |
| Example 2 | 137.6 | 293 | none | 0.8 |
| Example 3 | 128.0 | 288 | none | 0.6 |
| Example 4 | 143.4 | 302 | none | 1.1 |
| Comparative Example 1 | 115.2 | 272 | yes | 1.8 |
| Comparative Example 2 | 133.8 | 280 | yes | 2.7 |
| Comparative Example 3 | 147.6 | — | yes | 3.3 |
| Comparative Example 4 | 128.1 | 288 | none | 1.0 |
| Comparative Example 5 | 124.3 | 284 | none | 1.2 |

What is claimed is:

1. A methylstyrene copolymer consisting essentially of:
   (A) 60 to 99 mol % of the structural unit represented by the following formula:

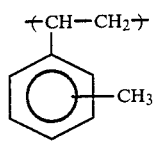

wherein at least 80 mol % the methyl groups are at the para position;
   (B) 40 to 1 mol % of the structural unit represented by the following formula:

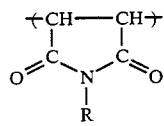

wherein R is a hydrogen atom, a $C_1$–$C_6$ alkyl group, or a $C_6$–$C_{10}$ aryl group.

2. The copolymer of claim 1 wherein the styrene units comprise from 95 to 99 wt % p-methylstyrene, 1 to 5 wt % m-methylstyrene, and 0 to 5 wt % o-methylstyrene.

3. The copolymer of claim 1 wherein the styrene units comprise from 65 to 97 mol % and the imide units comprising from 3 to 35 mol %.

4. The copolymer of claim 3 wherein the styrene units comprises from 80 to 95 mol % and the imide units comprise from 5 to 20 mol %.

5. The copolymer of claim 3 wherein the R is a $C_6$–$C_{10}$ aryl group.

6. The copolymer of claim 5 wherein R is a phenyl group.

7. The copolymer of claim 1 wherein the copolymer has a weight average molecular weight between 10,000 and 300,000 and a molecular weight distribution(Mw/Mn) between 1.5 and 4.0.

8. A copolymer consisting essentially of
   (A) from 65 to 97 mol % of the structural unit represented by the formula:

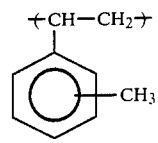

at least 80 wt % of which is p-methylstyrene; and
   (B) from 3 to 35 mol % of N-phenylmaleimide represented by the structural formula:

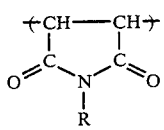

wherein R is phenyl.

9. A copolymer as defined in claim 8 wherein the methylstyrene further comprises from 1 to 5 wt % of the m-methylstyrene.

10. A copolymer as defined in claim 8 wherein the copolymer has a weight average molecular weight (Mw) between 10,000 and 100,000 and a molecular weight distribution (Mw/Mn) of between 2 and 3.

11. The copolymer of claim 8 wherein the copolymer has a triad distribution as follows:

| | |
|---|---|
| AAA | 50 to 88% |
| BAA | 4 to 20% |
| AAB | 4 to 20% |
| BAB | 4 to 12% | wherein A represents the methylstyrene structural unit and B represents the N-phenylmaleimide structural unit.

12. A copolymer of claim 11 wherein the copolymer has the following thermal properties:
   decomposition temperature: above 285° C.
   Vicat softening temperature: above 125° C.
   Geer test weight loss: decomposition temperature below 300° C.—less than 1.0% and for decomposition temperatures of 300° C. and above, less than 2.0%.

13. A method of preparing a heat resistant copolymer comprising:
   (a) adding N-substituted maleimide to methylstyrene, at least 80 mol % of which is p-methylstyrene, at polymerization conditions and at a substantially constant rate over a period substantially equal to 50 to 90% of the total polymerization time, the total ratio of said maleinimide and said methylstyrene being between 1:4 and 1:19; and
   (b) continuing polymerization at polymerization conditions for a period substantially equal to 50 to 10% of the total polymerization time.

* * * * *